July 5, 1932.　　　P. W. KOHL　　　1,865,921
CHICKEN FEEDER
Filed Oct. 26, 1931　　2 Sheets-Sheet 1
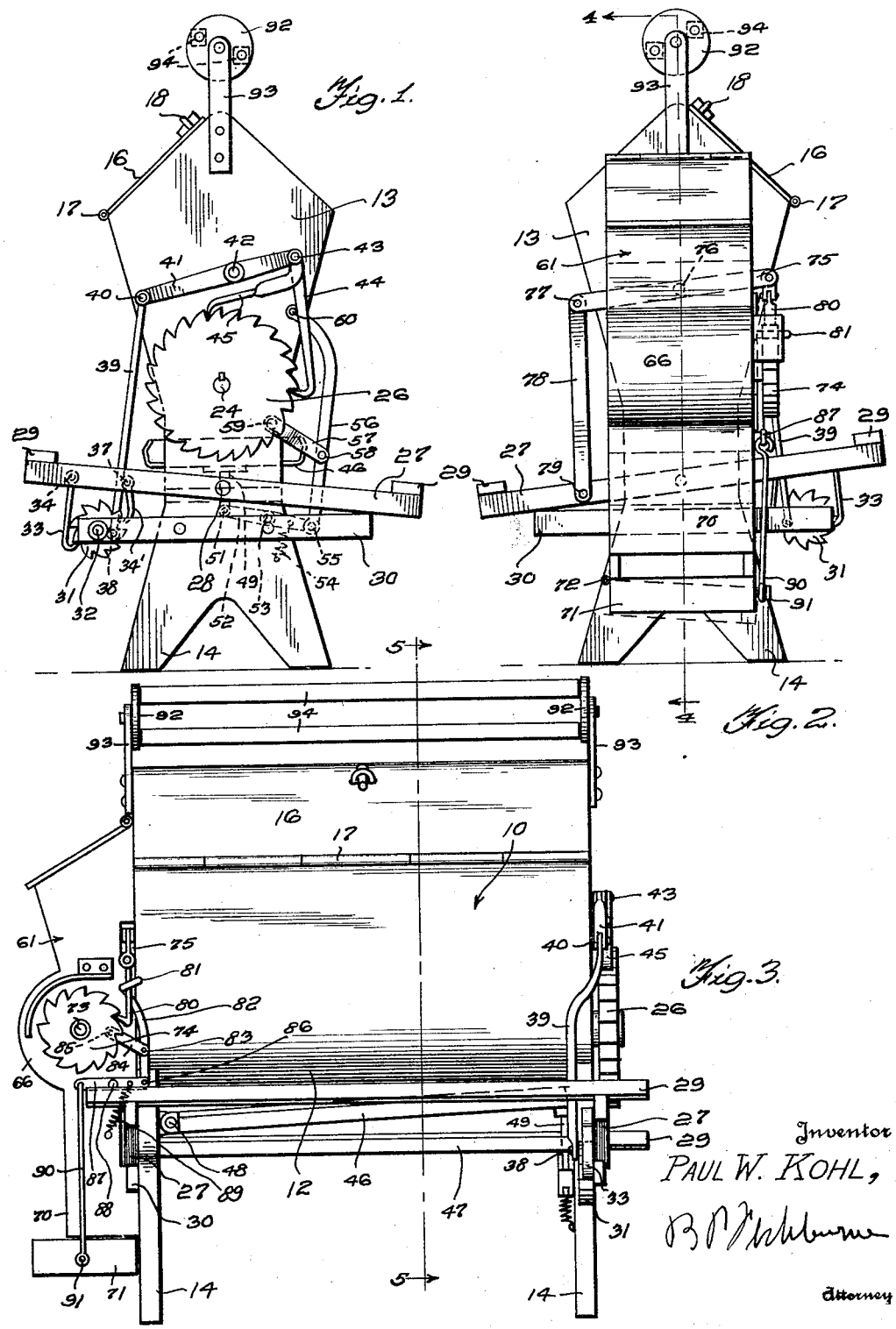

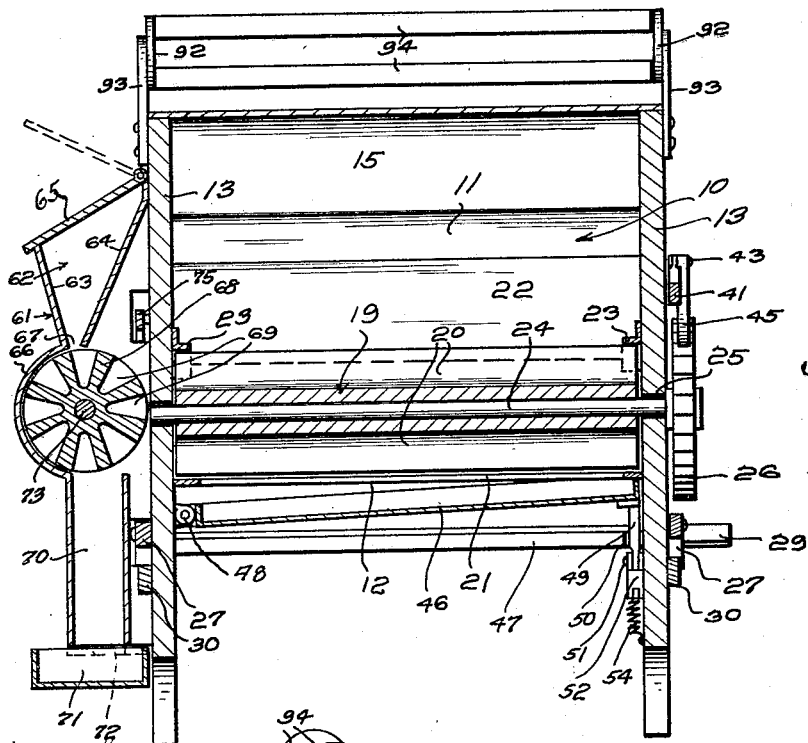

Patented July 5, 1932

1,865,921

UNITED STATES PATENT OFFICE

PAUL W. KOHL, OF ROCK, WISCONSIN

CHICKEN FEEDER

Application filed October 26, 1931. Serial No. 571,233.

My invention relates to improvements in chicken feeders.

An important object of the invention is to provide a chicken feeder which will permit of the storing of a considerable amount of feed or mash and automatically deliver the same to a point accessible to the chickens.

A further object of the invention is to provide a chicken feeder which will retain the feed clean.

A further object of the invention is to provide a chicken feeder which is automatically actuated by the weight of the chicken or chickens, to deliver the feed to a point accessible to the chickens, and which will afford exercise to the chickens.

A further object of the invention is to provide means to automatically render the feeding means inoperative when a selected amount of feed is supplied to a pan or the like, thus cutting off the feeding of the material, and again rendering the feeding means operative, when the feed has been consumed in whole or in part.

A further object of the invention is to provide a feeder embodying means to supply crushed or ground oyster shells or other suitable mineral material to a point accessible to the chickens, the feeding of such material being effected by the weight of the chickens and regulated by the weight of the material fed.

Other objects and advantages of the invention will be apparent during the course of the following description.

In the accompanying drawings, forming a part of this specification, and in which like numerals are employed to designate corresponding parts throughout the same, Figure 1 is an elevation of one end of the feeder, Figure 2 is an elevation of the opposite end of the feeder, Figure 3 is a side elevation of the feeder, Figure 4 is a longitudinal vertical section taken on line 4—4 of Figure 2, Figure 5 is a transverse section taken on line 5—5 of Figure 3, In the drawings, wherein for the purpose of illustration is shown a preferred embodiment of my invention, the numeral 10 designates a main vertical hopper, as a whole, for receiving and holding the feed or mash. This hopper embodies sides 11, which converge downwardly to form a circularly curved bottom 12. These sides are attached to ends 13, extending downwardly in the form of legs 14, as shown. The hopper has an upwardly tapering top, embodying a stationary cover 15 and a movable cover 16, hinged at 17 to one side 11, and adapted to be held in the closed position by a latch device 18, of any well known or preferred type.

Disposed within the lower portion of the hopper 10 and in close relation to the bottom 12, is a rotary feeder or feeding roll 19, having radial pockets 20, for the reception of the feed or mash. These pockets are adapted to be brought into registration with a longitudinal slot 21, formed in the bottom 12. Arranged adjacent the sides 11 and inwardly of the same, are downwardly converging guide or deflector plates 22, suitably attached to the ends 13 and resting upon curved flanges 23. carried by the ends 13. The end portions of the sides 22 which rest upon the flanges 23 are preferably cut away for the thickness of the flanges, whereby the deflector plates 22 may have substantial sliding contact with the feeder or feeding roll 19. The purpose of these deflector plates is to properly conduct the feed to the pockets 20, as they approach the upper position, and also to prevent the feed from passing between the periphery of the feeder and the deflector plates 22.

The feeder or feeding roll 19 is rigidly mounted upon a horizontal shaft 24, journaled in openings or bearings 25, formed in the ends 13, and having a ratchet wheel 26 rigidly secured thereto for rotating the same.

Means are provided to effect an intermittent turning movement of the feeding roll 19, including vertically swinging levers 27, which are arranged upon the outer sides of the legs 14 and are pivotally mounted thereon, as shown at 28. These levers extend upon the opposite sides of the hopper 11, as shown, and are rigidly connected, at their ends, by perch bars 29, arranged upon opposite sides of the hopper 11 and spaced a suitable distance therefrom, as shown. Stationary horizontal bars 30 are mounted upon the outer sides of the legs 14, and rigidly attached thereto, and disposed a short distance from the levers 27, and serve to limit their swinging movements in opposite directions.

A small ratchet wheel 31 is rotatably mounted upon one stationary bar 30, as shown at 32. This ratchet wheel is arranged to be engaged by a pulling pawl 33, pivoted to the adjacent lever 27, as shown at 34. A pushing pawl 34' is arranged upon the opposite side of the ratchet wheel 31 to engage therewith, and this pushing pawl is pivoted to the lever 27, as shown at 37. The function of the pushing pawl 34' is to engage the teeth of the ratchet wheel 31, when the pawl 34 descends, to either hold the ratchet wheel against reverse turning movement or to turn it sufficiently whereby the pulling pawl 33 will properly engage beneath the next tooth of the ratchet wheel.

Pivotally connected with the inner side of the ratchet wheel 31, as shown at 38, is a rod 39, Figure 1, extending upwardly, and pivotally connected at 40, with a lever 41, supported upon a pivot 42, attached to the end 13. Pivotally connected with the opposite end of the lever 41, by a common pivot 43, is a pulling pawl 44, arranged to engage with the teeth of the ratchet wheel 26, and a pushing pawl 45, also arranged to engage with such teeth. The function of the pushing pawl 45 is to prevent reverse turning movement of the ratchet wheel and to also slightly turn the same so that the pulling pawl will properly engage beneath the next lower tooth of the ratchet wheel when the forward end of the lever 41 is shifted to the lowermost position.

The feed discharged from the pockets 20 passes through the slot 21, and is collected in a feed pan or receptacle 46, arranged near and above a stationary horizontal beam 47, rigidly connecting the legs 14. One end of the tray 46 is pivoted at 48, so that the opposite end of the tray is free to swing vertically within limits. The free end of the tray is attached to a reciprocatory rod 49, which is vertically disposed and operates through an opening 50. At its lower end, this rod is pivoted at 51, with a vertically swinging lever 52, pivoted to the leg 14, at 53. A retractile coil spring 54 is attached to the lever 52, and serves to swing the lever in one direction so that its upper end is moved upwardly. Pivoted to the outer end of the lever 52, as shown at 55, is a shifting arm 56. This arm has pivotal connection with a guide link 57, as shown at 58, and the inner end of this guide link is pivoted at 59, with the legs 14, as shown. The upper end of the shifting arm 56 is bent inwardly and is provided with an outwardly extending finger or pin 60, engaging inwardly of or behind the pulling pawl 44. The spring 54 normally retains the free end of the tray 46 elevated, but when a selected amount of feed is discharged thereon, the weight of the same depresses the free end of the tray, overcoming the action of the spring 54, causing the shifting arm 56 to rise which, in turn, moves the pin 60 upwardly and outwardly, swinging pulling pawl 44 out of the path of travel of the ratchet wheel 26. When this occurs, further swinging movement of the levers 27 do not rotate the ratchet wheel 26, as the pulling pawl cannot now engage beneath the ratchet teeth.

I also provide a feeding device for supplying ground oyster shells or other ground mineral material, to a point accessible to the chickens. This means embodies a housing 61, disposed exteriorly of and attached to one of the ends 13, and this housing includes an upper hopper 62, having downwardly converging sides 63 and 64, and a swinging cover 65. At the lower end of the hopper 61 is a circularly curved tray or bottom 66, disposed adjacent to the outlet 67 of the hopper.

The numeral 68 designates a rotary feeder or feed roll, having radial pockets 69, and this roll travels in close relation to the curved tray 66, and is adapted to discharge the contents of its pockets into a vertical chute 70. This chute, in turn, discharges into a tray or receptacle 71, which is pivotally supported at one end, as shown at 72, while its free end is capable of being raised and lowered. The feeding roll 68 is rigidly mounted upon a horizontal transverse shaft 73, suitable journaled in the sides of the housing 61, and this shaft has a ratchet wheel 74 rigidly attached thereto, as shown. A lever 75 is pivotally supported between its ends, as shown at 76, and has pivotal connection at 77, with a link 78 extending downwardly for pivotal engagement with the adjacent lever 27, as shown at 79. The opposite end of the lever 75 pivotally carries a pulling pawl 80, arranged to engage the ratchet wheel 74. The shank of this pulling pawl is loosely mounted in a loop 81, carried by the upper end of a shifting arm 82. This shifting arm is pivotally connected at 83 with a guide link 84, pivotally supported at its opposite end, as shown at 85. The lower end of the shifting element 82 has pivotal connection at 86, with a lever 87, pivotally supported at 88. The inner end of this lever is drawn downwardly by a retractile coil spring 89, and its outer end has pivotal connection with a link 90, pivoted at 91, with the free end of the tray 71. It is thus seen that the spring 89 normally holds the free end of the tray elevated, and when this occurs, the swinging movement of the levers 27 swing the lever 75 upon its pivot, causing the pulling pawl 80 to be raised and lowered, engaging with the teeth of the ratchet wheel 74, effecting an intermittent turning movement of the same. When the tray 71 receives a selected amount of material, the weight of such material overcomes the action of the spring 89, and the free end of the tray is swung downwardly, which movement is transmitted to the lever 87 through the link 90, swinging the inner end of the lever 87 upwardly, causing the shifting arm 82 to be raised and swung outwardly, and this shifting arm retains the pulling pawl 80 out of engagement with the ratchet wheel 74, during the further swinging movement of lever 75. After the material has been removed from the tray 71, the free end of the same again rises and the pawl 80 is permitted to gravitate to the inner position whereby it is again capable of effecting an intermittent turning movement of the ratchet wheel 74.

A movable perch reel is mounted upon the top of the hopper, to prevent the chickens from roosting upon such top. This reel includes discs 92, rotatably mounted upon standards 93, rigidly attached to the sides 13. These discs are connected by bars 94, which are pivotally connected therewith so that the bars are free to turn upon their longitudinal axes with relation to the discs, which are also rotatable. Any chicken attempting to roost upon the reel will fall therefrom by virtue of the turning movement of the bars 94 upon their longitudinal axes, or by the rotation of the entire reel.

The operation of the feeder is as follows:

The hopper 10 is suitably filled with the feed or mash, and some of the same is also placed within the tray 46, it being assumed that the feed in the tray 46 is not sufficient to move the free end of the tray downwardly. The ground oyster shells or mineral material is also introduced into the hopper 62 and into the tray 71, but not in a sufficient amount within the tray to swing its free end downwardly. In order to reach the feed within the tray 46 the chickens jump upon the perch bars 29, and the unbalanced weights upon these perch bars cause an up and down movement of the perch bars. This movement of the perch bars swings the levers 27 upon their pivots, which through the medium of the pawls 33 and 34' effect an intermittent turning movement of the ratchet wheel 31. This turning movement of the ratchet wheel is transmitted to the lever 41 through the medium of rod 39, whereby lever 41 is oscillated upon its pivot and effects an intermittent turning movement of the ratchet wheel 26. This ratchet wheel turns the feed roll 19, discharging the contents of the pockets 20 through the slot 21. The feed passing through the slot 21 is connected in the tray 46, and when a selected amount of this feed is thus introduced into the tray 46, the free end of the tray is swung downwardly. This movement of the tray swings the outer end of lever 52 upwardly, causing shifting arm 56 to swing upwardly and outwardly, whereby the pin 60 shifts the pulling pawl 44 to an outer position, whereby the pulling pawl cannot now engage the teeth of the ratchet wheel 26. The up and down movements of the perch bars will not now effect a turning movement of ratchet wheel 26. When the chickens have eaten the feed within the tray so that the weight of the same falls below a selected amount, the spring 54 will return the free end of the tray to the elevated position, and shifting arm 56 is lowered so that the pulling pawl 44 again gravitates to the inner position for engagement with the teeth of the ratchet wheel. Further up and down movement of the perch bars 29 will now effect the intermittent turning movement of the ratchet wheel 26 and feeding roll 19. During the turning movement of the feeding roll 19, roll 68 is also intermittently turned for feeding the ground mineral material into the tray 71. When the weight of the mineral material within this tray reaches a selected point, the free end of the tray 71 descends, in opposition to the spring 89, and this action causes the shifting arm 82 to be raised and moved outwardly. Loop 81 now swings pulling pawl out of engagement with the ratchet wheel 74, and hence the ratchet wheel cannot be turned by the pulling pawl 80 until sufficient mineral material has been consumed from within the tray, so that the free end of this tray may again move to the elevated position.

It is to be understood that the form of my invention herewith shown and described is to be taken as the preferred example of the same, but that various changes in the shape, size and arrangement of parts may be resorted to without departing from the spirit of the invention or the scope of the subjoined claims.

Having thus described my invention, I claim:

1. In a chicken feeder, a hopper for holding the feed or mash, a tray arranged beneath the hopper and having a part which is vertically movable, a movable feeding device for discharging the material from the hopper into the tray, a movable structure arranged near the hopper and embodying a perch bar, driving connecting means between the movable structure and the feeding device so that the movement of the movable structure effects a feeding movement of the feeding device, and means actuated by the downward movement of a part of the tray to render the driving connecting means inoperative with respect to moving the feeding device.

2. In a chicken feeder, a hopper, a tray arranged beneath the hopper and having a part which is vertically movable, a feeding roll for discharging the material from the hopper into the tray, a pivoted structure arranged near the hopper and embodying a perch bar, a ratchet wheel connected with the feeding roll to turn it, a pivoted lever arranged near the ratchet wheel, a pawl carried by the pivoted lever to engage with the ratchet wheel to turn the same, driving connecting means between the pivoted structure and lever, and means automatically actuated by the downward movement of a part of the tray to shift the pawl to a position out of engagement with the ratchet wheel.

3. In a chicken feeder, a hopper, a tray arranged beneath the hopper and having a part which is vertically movable, a feeding roll for discharging the material from the hopper into the tray, a pivoted structure arranged near the hopper and embodying perch bars disposed upon opposite sides of the hopper, a ratchet wheel connected with the feeding roll to turn it, a pivoted lever arranged near the ratchet wheel, a pawl carried by the pivoted lever to engage with the ratchet wheel, driving connecting means between the pivoted structure and lever, a second pivoted lever connected with the movable part of the tray, a spring to move the second lever in one direction, and a shifting device moved by the second lever to shift the pawl out of engagement with the ratchet wheel.

4. In a chicken feeder, a hopper, a tray arranged beneath the hopper and having a part which is vertically movable, a feeding roll for discharging the material from the hopper into the tray, a pivoted structure arranged near the hopper and embodying perch bars disposed upon opposite sides of the hopper, a ratchet wheel connected with the feeding roll to turn it, a pivoted lever arranged near the ratchet wheel, a pawl carried by the pivoted lever to engage with the ratchet wheel, driving connecting means between the pivoted structure and the lever, a second pivoted lever connected with the tray to be moved thereby, a spring to move the second pivoted lever in one direction, a shifting arm pivoted to the second lever and having a part engaging the pawl, and a pivoted guide link having pivotal connection with the shifting arm.

5. In a chicken feeder, a hopper, a tray arranged beneath the hopper and having a part which is vertically movable, a feeding roll for discharging the material from the hopper into the tray, a pivoted structure arranged near the hopper and embodying perch bars disposed upon opposite sides of the hopper, a fixed support, a ratchet wheel rotatable upon the fixed support, a pawl carried by the pivoted structure to engage the ratchet wheel, a second ratchet wheel connected with the feeding roll to turn it, a pivoted lever arranged near the second ratchet wheel, a rod pivotally connecting the lever and first-named ratchet wheel, a pawl carried by the lever to engage the second ratchet wheel, and means operated by the downward movement of a part of the tray to shift the last-named pawl from the second ratchet wheel.

6. In a chicken feeder, a hopper, a tray arranged beneath the hopper, a feeding roll for discharging material from the hopper into the tray, a ratchet wheel connected with the feeding roll to turn it, a pivoted structure embodying perch bars arranged upon opposite sides of the hopper, a fixed support, a ratchet wheel carried by the fixed support, a pawl carried by the pivoted structure to engage the ratchet wheel, a pivoted lever arranged near the first-named ratchet wheel, a pawl carried by the pivoted lever to engage the first-named ratchet wheel, and a rod pivotally connecting the lever and first-named ratchet wheel.

7. In a chicken feeder, a hopper, a tray arranged beneath the hopper and having one end pivotally supported so that its free end is capable of being raised and lowered, a feeding roll disposed to discharge material from the hopper into the tray, a pivoted structure embodying perch bars disposed upon opposite sides of the hopper, driving connecting means between the pivoted structure and feeding roll, a pivoted lever having one end connected with the free end of the tray, a spring to move the lever in a direction to elevate the free end of the tray, and a shifting device connected with the lever and associated with the driving connecting means and adapted to render such driving connecting means inoperative with respect to turning the feeding roll when the free end of the tray descends.

8. In a chicken feeder, a hopper for holding the material, a tray arranged beneath the hopper, a feeding roll to discharge material from the hopper into the tray, a ratchet wheel connected with the feeding roll, a pivoted lever arranged near the ratchet wheel, a pulling pawl and a pushing pawl carried by the lever and arranged to engage the ratchet wheel, a fixed support, a second ratchet wheel mounted upon the said fixed support, a pivoted structure embodying perch bars disposed upon opposite sides of the hopper, a pulling pawl and a pushing pawl carried by the pivoted structure and arranged to engage the second ratchet wheel, and a rod pivotally connected to the second ratchet wheel and with the lever.

9. In a chicken feeder, a hopper, a tray arranged beneath the hopper and having a vertically movable part, a roll to feed material from the hopper to the tray, means to turn the roll, a pivoted lever connected with the vertically movable part of the tray, a spring to move the lever in a direction to elevate the vertically movable part of the tray, and a shifting device connected with the lever to render the turning means inoperative with respect to driving the feeding roll when the vertically movable part of the tray descends.

In testimony whereof, I affix my signature.

PAUL W. KOHL.